United States Patent
Miyake et al.

(10) Patent No.: US 8,311,267 B2
(45) Date of Patent: Nov. 13, 2012

(54) INFORMATION PROCESSING APPARATUS AND METHOD, AND PROGRAM

(75) Inventors: Toru Miyake, Tokyo (JP); Kei Hiraizumi, Kanagawa (JP); Yoshinori Takagi, Kanagawa (JP); Masato Akao, Kanagawa (JP); Yasunobu Node, Tokyo (JP); Yoshihito Fujiwara, Kanagawa (JP); Kazutaka Ando, Kanagawa (JP); Naoki Kobayashi, Tokyo (JP); Michimasa Obana, Tokyo (JP); Yoshihiro Takahashi, Chiba (JP); Takeyuki Fujii, Tokyo (JP); Masanori Machimura, Tokyo (JP); Toru Nakagawa, Tokyo (JP); Yusuke Kajio, Tokyo (JP); Yasuhiro Fujimori, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 1071 days.

(21) Appl. No.: 12/122,344

(22) Filed: May 16, 2008

(65) Prior Publication Data
US 2008/0285800 A1 Nov. 20, 2008

(30) Foreign Application Priority Data
May 16, 2007 (JP) .................. 2007-130388

(51) Int. Cl.
*G06K 9/00* (2006.01)
(52) U.S. Cl. .................................................... 382/100
(58) Field of Classification Search .................. 382/100, 382/103, 195, 104, 282
See application file for complete search history.

(56) References Cited

U.S. PATENT DOCUMENTS

| 5,734,444 | A | | 3/1998 | Yoshinobu |
| 5,912,721 | A | * | 6/1999 | Yamaguchi et al. .......... 351/210 |
| 6,072,525 | A | | 6/2000 | Kaneda |
| 6,246,779 | B1 | * | 6/2001 | Fukui et al. ................... 382/103 |
| 6,346,929 | B1 | * | 2/2002 | Fukushima et al. .............. 345/8 |
| 6,611,283 | B1 | * | 8/2003 | Isonuma ......................... 348/51 |
| 7,076,118 | B1 | * | 7/2006 | Westerman ................... 382/305 |
| 7,331,929 | B2 | * | 2/2008 | Morita et al. ................. 600/558 |
| 7,429,108 | B2 | * | 9/2008 | Rosenberg .................... 351/209 |
| 7,551,200 | B2 | * | 6/2009 | Okada et al. ............. 348/207.11 |
| 2007/0011609 | A1 | * | 1/2007 | Adjouadi et al. ............. 715/700 |
| 2010/0134641 | A1 | * | 6/2010 | Marti et al. ................ 348/222.1 |

FOREIGN PATENT DOCUMENTS

| JP | 8-180504 | | 7/1996 |
| JP | 10-136233 | | 5/1998 |
| JP | 11259673 A | * | 9/1999 |
| JP | 11-275351 | | 10/1999 |
| JP | 2006-238393 | | 9/2006 |
| JP | 2006-293898 | | 10/2006 |

OTHER PUBLICATIONS

Japanese Office Action issued Apr. 24, 2012, in Patent Application No. 2007-130388.

* cited by examiner

*Primary Examiner* — Brian P Werner
*Assistant Examiner* — Shefali Goradia
(74) *Attorney, Agent, or Firm* — Oblon, Spivak, McClelland, Maier & Neustadt, L.L.P.

(57) ABSTRACT

An information processing apparatus includes an obtaining unit configured to obtain feature quantities of an image; and a detector configured to detect a gazing point at which a user gazes within the image, wherein the gazing point detected by the detector among the feature quantities obtained by the obtaining unit or the feature quantities extracted from the image in a predetermined range containing the gazing point is stored.

7 Claims, 9 Drawing Sheets

INFORMATION PROCESSING APPARATUS AND METHOD, AND PROGRAM

CROSS REFERENCES TO RELATED APPLICATIONS

The present invention contains subject matter related to Japanese Patent Application JP 2007-130388 filed in the Japanese Patent Office on May 16, 2007, the entire contents of which are incorporated herein by reference.

BACKGROUND OF THE INVENTION

1. Field of the Invention

The present invention relates to an information processing apparatus and method, and a program. More particularly the present invention relates to an information processing apparatus and method capable of obtaining information associated with operations when an operation history of a user, or the like is to be obtained, and to a program for use therewith.

2. Description of the Related Art

Parameters for determining characteristics of an image to be received by a television receiver, and the like are configured in such a manner that a user can set the parameters as desired.

The assignee of the present invention has proposed that parameters are to be set in advance in accordance with a history in which states of selected channels are stored, and programs to be viewed by a user at a high frequency can be made to be viewed without bothering the user having to make such a setting by hand (see, for example, Japanese Unexamined Patent Application Publication No. 8-180504).

SUMMARY OF THE INVENTION

A user is able to make adjustments so that image visual characteristics matching the user's preferences are obtained by repeatedly setting parameters as necessary, however, this fact means that there are cases in which operations for setting parameters need to be performed a plurality of times until a processing result that is satisfactory to the user is obtained.

In order that operations related to setting do not need to be performed a plurality of times, it has been desired that, for example, at the design stage of a television receiver, image characteristics matching the user's preferences are set in advance.

The present invention has been made in view of such circumstances. It is desirable to obtain a history regarding operations of a user and information regarding the history.

According to an embodiment of the present invention, there is provided an information processing apparatus including: obtaining means for obtaining feature quantities of an image; and detection means for detecting a gazing point at which a user gazes within the image, wherein, among the feature quantities obtained by the obtaining means, feature quantities extracted from an image at the gazing point detected by the detection means or a part of the image in a predetermined range containing the gazing point are stored.

The information processing apparatus may further include tracking zoom processing means for performing processing for tracking an image in a predetermined portion within the image and for displaying the image in the predetermined portion in a zoomed state, wherein the detection means sets a tracking point set by the tracking zoom processing means to be the gazing point.

The part of the image in the predetermined range may be the image in the predetermined portion.

Information on an operation performed by the user may be stored in such a manner as to be associated with the extracted feature quantities.

According to another embodiment of the present invention, there is provided an information processing method including the steps of: obtaining feature quantities of an image; and detecting a gazing point at which a user gazes within the image, wherein control is performed so that, among the obtained feature quantities, feature quantities extracted from an image at the detected gazing point or an image in a predetermined range containing the gazing point are stored on a predetermined storage medium.

According to another embodiment of the present invention, there is provided a computer-readable program including the steps of: obtaining feature quantities of an image; and detecting a gazing point at which a user gazes within the image, wherein control is performed so that, among the obtained feature quantities, feature quantities extracted from an image at the detected gazing point or an image in a predetermined range containing the gazing point are stored on a predetermined storage medium.

In the information processing apparatus and method, and the program according to the embodiments of the present invention, the features of an image in a portion at which a user gazes is stored as a log.

According to the embodiments of the present invention, it is possible to obtain an operation history of a user and obtain information regarding in what kind of circumstances the operations have been performed. Therefore, it is possible to perform a more detailed analysis by using the history and the information.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that an embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Figure 7:
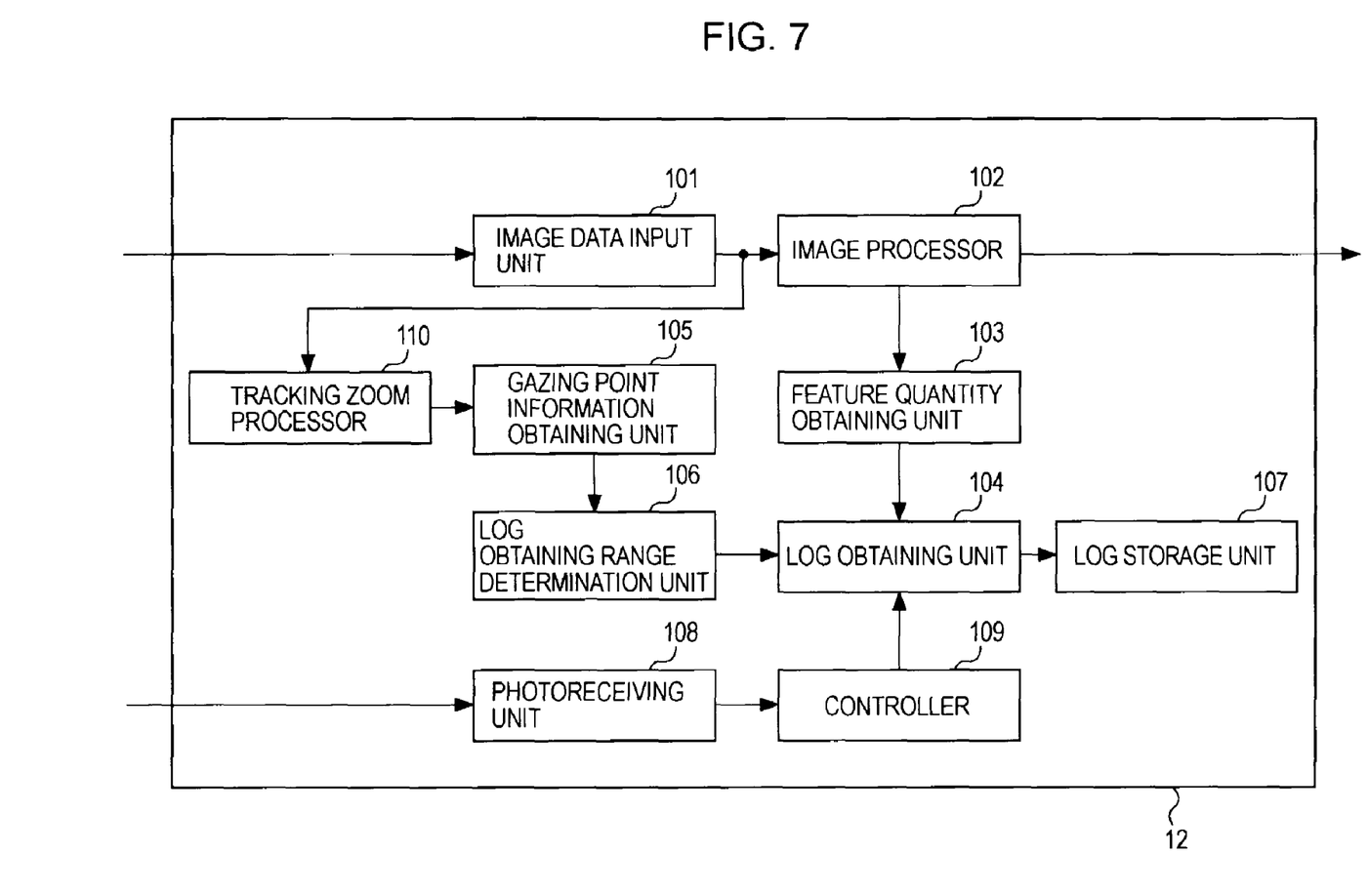
FIG. 7 shows an example of the internal configuration of a log obtaining device.

An information processing apparatus according to an embodiment of the present invention includes obtaining means (for example, a feature quantity obtaining unit 103 in FIG. 7) for obtaining feature quantities of an image; and detection means (for example, a gazing point information obtaining unit 105 in FIG. 7) for detecting a gazing point at which a user gazes within the image, wherein the gazing point detected by the detection means among the feature quantities obtained by the obtaining means or the feature quantities extracted from the image in a predetermined range containing the gazing point is stored.

The information processing apparatus further includes tracking zoom processing means (for example, a tracking zoom processor 110 in FIG. 7) for performing processing for tracking an image in a predetermined portion within the image and for displaying the image in the predetermined portion in a zoomed state.

Embodiments of the present invention will now be described below with reference to the drawings.

Configuration of the System

Figure 1:
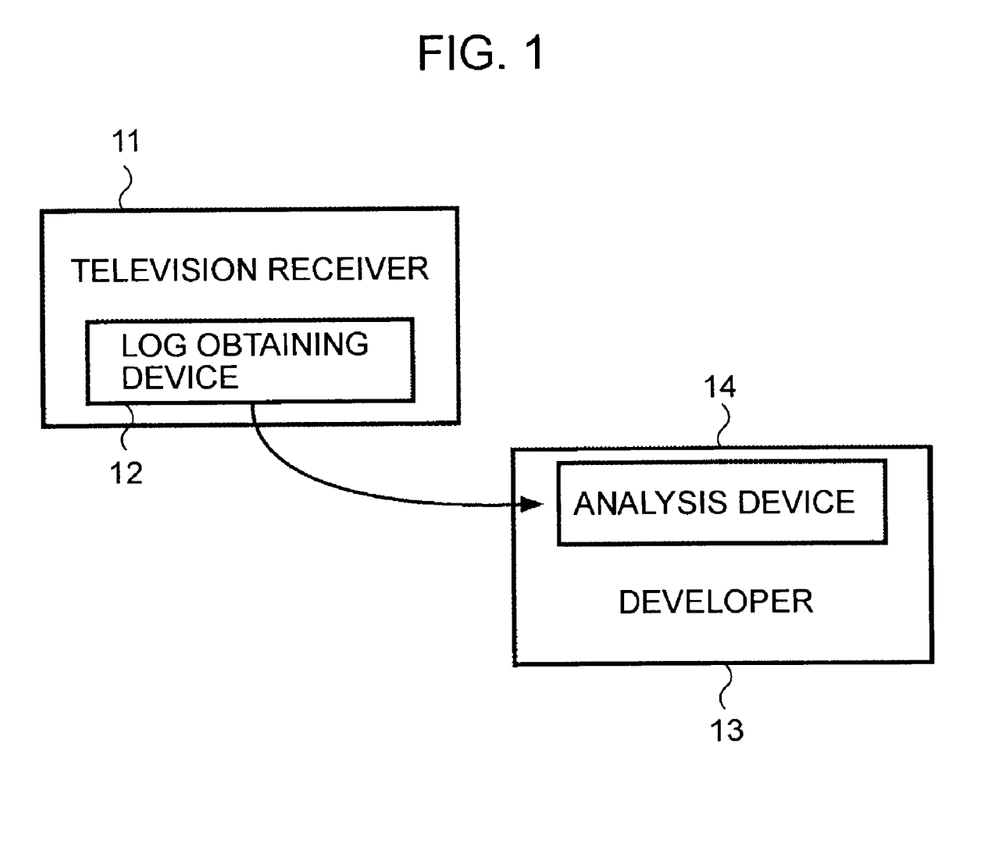
FIG. 1 shows the configuration of an embodiment of a system to which the present invention is applied.

FIG. 1 shows an example of the configuration of an embodiment of a system to which the present invention is applied. The system shown in FIG. 1 includes a television receiver 11, a log obtaining device 12, a developer 13, and an analysis device 14.

The television receiver 11 is a device on the user side, and is a device for receiving a television broadcast and providing video and audio of a program to a user. The television receiver 11 includes a log obtaining device 12. The log obtaining device 12 may be incorporated into the television receiver 11 or may be externally provided. As will be described later, the log obtaining device 12 stores the operation history of the user, and the like as a log.

The developer 13 is a person on the side in which the television receiver 11 is developed. The log obtaining device 12 provided in the television receiver 11 is provided to the developer 13 side at a predetermined time. The developer 13 sets the obtained log obtaining device 12 in the analysis device 14, reads information, such as a log, stored in the log obtaining device 12, and analyzes the information. The analysis result is used to further develop the television receiver 11.

For example, in the log obtaining device 12, information, such as what kind of setting of image characteristics a user has performed, and what kind of image the image when the setting was performed was, is stored. The developer 13 can use the information stored in the log obtaining device 12 as one source of information about what kind of image characteristics users prefer.

The log obtaining device 12 may be provided to the developer 13 at any time. For example, when the television receiver 11 is to be disposed of, the log obtaining device 12 is taken out from the television receiver 11 and is provided to the developer 13. When this is to be performed, it is necessary for the log obtaining device 12 to have stored a log from when the user purchased the television receiver 11 until the user wished to dispose of it.

However, if the storage capacity of the log obtaining device 12 is large, the cost of a storage medium of the log obtaining device 12 is increased or the size thereof is increased. Therefore, it is preferable that the storage capacity of the log obtaining device 12 be as small as possible. In this embodiment, as a result of storing a log as will be described below, even if the storage capacity of the log obtaining device 12 is small, a sufficient amount of information can be stored.

Example of Configuration of Log Obtaining Device

Figure 2:
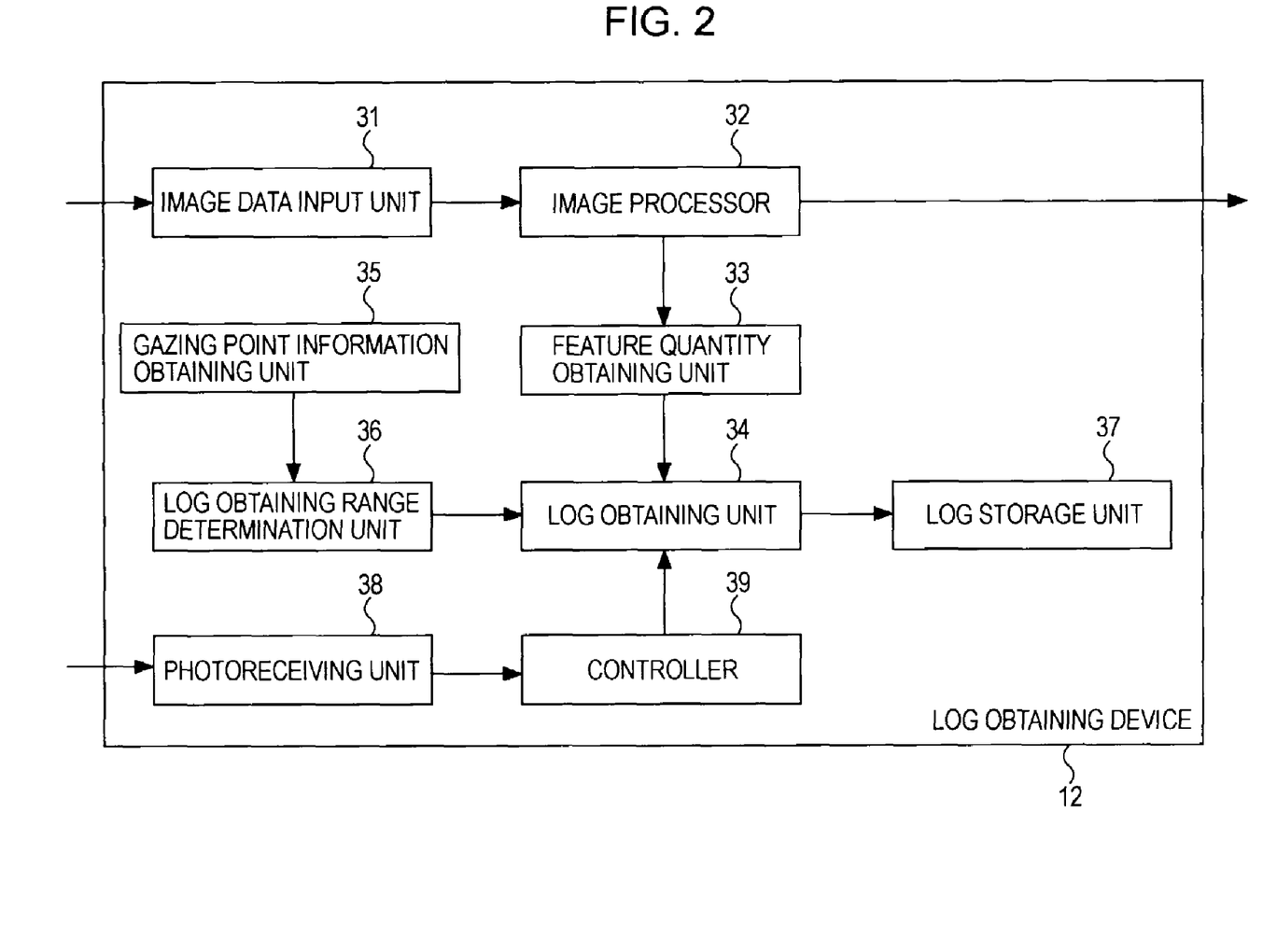
FIG. 2 shows an example of the internal configuration of a log obtaining device.

FIG. 2 shows an example of the internal configuration of the log obtaining device 12. The log obtaining device 12 includes an image data input unit 31, an image processor 32, a feature quantity obtaining unit 33, a log obtaining unit 34, a gazing point information obtaining unit 35, a log obtaining range determination unit 36, a log storage unit 37, a photoreceiving unit 38, and a controller 39.

The log obtaining device 12 includes parts that are necessary to configure the television receiver 11. For example, the photoreceiving unit 38 is a unit for receiving a signal from a remote controller 51 (FIG. 4B) of the television receiver 11. This is a unit necessary to configure the television receiver 11 and is also necessary for the log obtaining device 12. Such a unit can be shared with the television receiver 11, and configuring in such a manner is possible.

The image data input unit 31 receives, for example, image data via an antenna (not shown) and a tuner for selecting a program of a television broadcast received by the antenna, receives image data from a DVD (Digital Versatile Disc) player, and supplies the input image data to the image processor 32.

The image processor 32 performs various kinds of processing on the input image data, for example, performs a decoding process, and outputs the decoded data to an external device (not shown), for example, a display device. Furthermore, the processing result of the image processor 32, data in the middle of processing, and the like are output to the feature quantity obtaining unit 33.

The feature quantity obtaining unit 33 obtains the feature quantities indicating the features of an image on the basis of the data supplied from the image processor 32. The feature quantities to be obtained will be described later. The feature quantities obtained by the feature quantity obtaining unit 33 are supplied to the log obtaining unit 34. The log obtaining unit 34 obtains, as a log, the feature quantities within the range determined by the log obtaining range determination unit 36 within the supplied feature quantities, and supplies them to the log storage unit 37.

The log obtaining range determination unit 36 determines the range in which a log is to be obtained on the basis of the information supplied from the gazing point information obtaining unit 35. The gazing point information obtaining unit 35 detects a portion at which the user (viewer) viewing the television receiver 11 gazes in particular within the image displayed on the display section (not shown) of the television receiver 11, and supplies the information to the log obtaining range determination unit 36. That is, on the basis of the information supplied from the gazing point information obtaining unit 35, the log obtaining range determination unit 36 determines a predetermined range in the vicinity of the gazing point to be a range in which a log is to be obtained.

The photoreceiving unit 38 receives a signal from the remote controller 51 (not shown) provided with an operation unit for operating the television receiver 11 and supplies the signal to the controller 39. The controller 39 analyzes the signal from the photoreceiving unit 38 and controls each section of the log obtaining device 12. Furthermore, the controller 39 supplies the analysis result to the log obtaining unit 34.

The log obtaining unit 34 obtains, as a log, the feature quantities within the range determined by the log obtaining range determination unit 36 (hereinafter referred to as a "feature quantity log" as appropriate), which are supplied from the feature quantity obtaining unit 33 and also, obtains information supplied from the controller 39 at the time as a log. The information supplied from the controller 39 is information on the history of the operations operated by the user using the remote controller 51 (hereinafter referred to as an "operation log" as appropriate). The log obtaining unit 34 causes the operation log and the feature quantity log to be stored in the log storage unit 37 in such a manner as to be associated with each other.

In this embodiment, since the configuration is formed in such a manner, an operation log regarding what kind of adjustments were performed when the user adjusted the image characteristics while browsing predetermined images displayed on the television receiver 11, and a feature quantity log from the image at which the user gazed are stored in the log storage unit 37 in such a manner as to be associated with each other.

In this embodiment, a description has been given by using an example in which the log obtaining device 12 is incorporated in the television receiver 11. The log obtaining device 12 may be incorporated in a device other than the television receiver 11.

Operation of Log Obtaining Device

Next, the operation of the log obtaining device 12 shown in FIG. 2 will be described with reference to the flowchart in FIG. 3.

In step S11, image data is obtained. The image data input unit 31 supplies the image data supplied from the outside to the image processor 32. In step S12, the feature quantities are obtained. On the basis of the data from the image processor 32, the feature quantity obtaining unit 33 extracts the feature quantities from the image to be processed at the time. Here, a description will be given of the feature quantities to be extracted.

As described above, by analyzing the log stored in the log obtaining device 12, the preferences of the user and a community to which the user belongs are analyzed to improve services. Also, with a view to performing product development and technology development, a log is stored and collected. Therefore, depending on what kind of analysis is to be performed, what kind of information is to be obtained, and how the log is utilized in product development when the log obtaining device 12 is collected, it is desirable that a log suitable for the objective is stored in the log obtaining device 12.

Here, by considering what kind of information analysis can be performed when certain feature quantities are obtained, the feature quantities to be obtained will be described.

First, as the feature quantities to be obtained, there are the feature quantities regarding an activity. Activity is one index indicating the degree to which the content of a segment is felt to be dynamic or static. For example, when the content is visually dynamic, the activity indicates the degree to which a camera is quickly moved over an object body or the degree to which an object whose image is being captured changes quickly.

This activity can be calculated indirectly by measuring the average value of non-similarities between frames of the feature quantities, such as a color histogram. For example, pixels constituting an image decoded by the process performed by the image processor 32 are sequentially handled as a pixel of interest, and the activity of the pixel values of the pixels in a predetermined block containing the pixel of interest is computed. For a block containing the pixel of interest, for example, a block of 3×3 pixels in which the pixel of interest is at the center thereof can be adopted. When an activity is stored as the feature quantity log, the feature quantity obtaining unit 33 computes the activity in the manner described above.

Between a portion in which activity is high (detailed portion and edge portion) and a portion in which activity is low (flat portion), it is considered that visual effects of various image characteristics adjustment differ. In this embodiment, the gazing point information obtaining unit 35 obtains information on the gazing point at which the user gazes, the feature quantity log of the gazing point is stored, and also, an operation log is stored. Therefore, it is possible to obtain the activity at the gazing point and an image characteristics adjustment value, as an operation log, the image characteristics adjustment being performed by the user for the image to have the image characteristics matching the user's preferences, and such a log is stored. By using the activity at the gazing point and the image characteristics adjustment value at the time of analysis, it is possible to analyze in more detail what the user wanted to achieve by the setting.

As another example of the feature quantities to be obtained, there are feature quantities regarding noise appearing in an image. In a compression process using the MPEG (Moving Picture Experts Group) system, which is a coding/decoding system, noise that differs depending on the position within the image occurs. According to this embodiment, it is possible to obtain the gazing point at which the user gazes and the feature quantities of noise that has occurred in the vicinity of the gazing point. Therefore, it is possible to know what kind of noise has occurred at the point at which the user has gazed by analyzing the log. As a consequence, the relationship between the viewing of the user and noise can be known in more detail.

As another example of the feature quantities to be obtained, there are feature quantities regarding the color of an image. In general, it is thought that human beings responds more to luminance than to color. By considering such a thing, in image processing, often, luminance is made to be an object to be processed. However, since there is an influence exerted by color on a human being, information on the color of the point at which the user gazes is considered to be useful for algorithm development in the future. By obtaining, as a log, the information on the color of the point at which the user gazes and by analyzing the log, it is possible to utilize the log for technology development regarding color.

Therefore, by storing, as a log, what kind of color the point at which the user has gazed is and how the user set the color (what kind of color the user prefers, and set as that color) and by analyzing the log, it is possible to know the setting. For example, for a user, the flesh color (the color of the skin of a human being) is considered to be important in image processing, and it is desired to improve the visual characteristics of the flesh color and color reproduction. By analyzing such a log obtained from the user, it is possible to utilize the log to technology development that improves the flesh color preferred by the user.

As another example of the feature quantities to be obtained, there are feature quantities regarding the motion of an object body within an image. For example, depending on whether the object the user is viewing is moving in such a manner as to traverse greatly within the screen or whether the object is fixed in the center of the screen and not moving, signal processing demanded by the user greatly differs. In the former case, signal processing good at handling motion is considered preferable, and in the latter case, signal processing specialized for still images is considered preferable. When such a fact is considered, by storing, as a log, the feature quantities indicating what kind of motion it was and the operation of the user at the time of display of the image and by analyzing the log, the motion of the image at the point at which the user has gazed can be made useful for the improvement of a technology for signal processing good at handling motion and for signal processing specialized for still images.

All such feature quantities contribute to making it possible to analyze in more detail information regarding what kind of image the user is gazing at.

Figure 3:
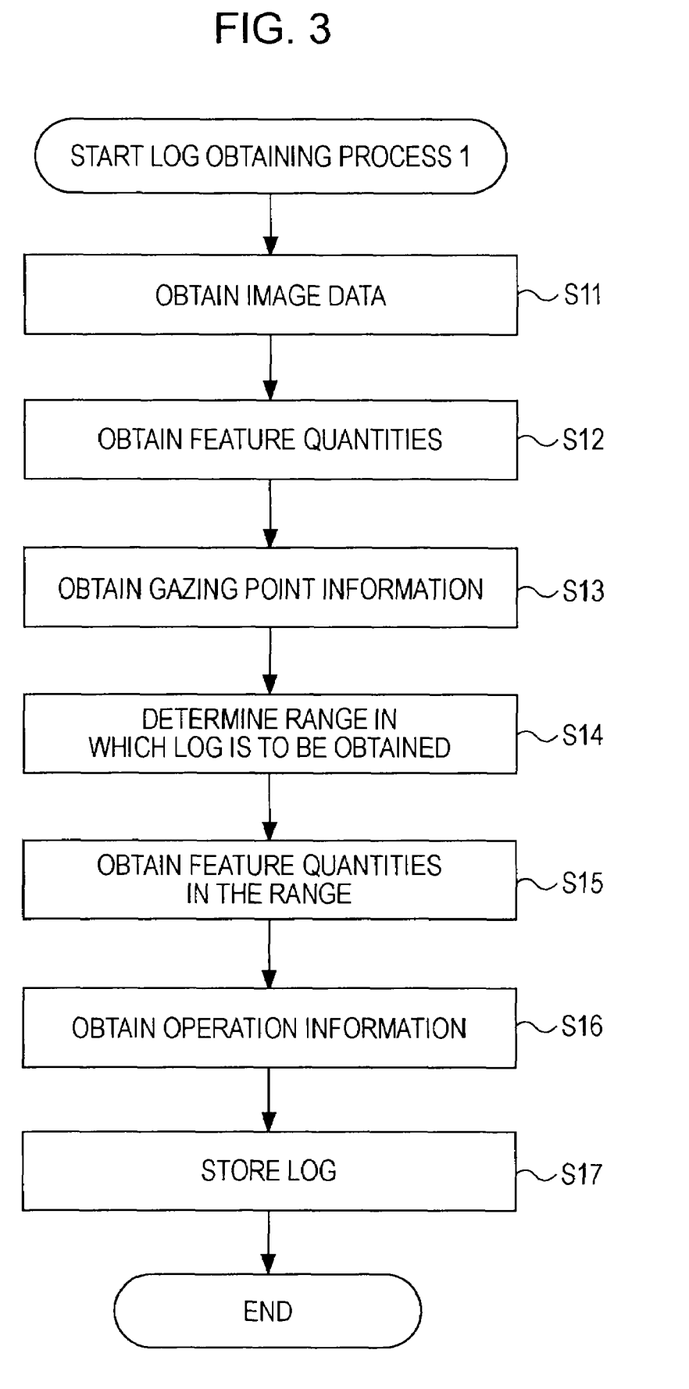
FIG. 3 is a flowchart illustrating the operation of the log obtaining device.

Returning to the description of the flowchart in FIG. 3, in step S12, the feature quantities are obtained. Since the feature quantities are stored as a feature quantity log in the log storage unit 37 in such a manner as to be associated with an operation log, the feature quantities may be obtained when the user performs some operation, in particular, an operation related to the setting of parameters such as those relating to image characteristics. In other words, the processing of the flowchart shown in FIG. 3 may be started by using, as a trigger, the fact that the user performs a predetermined operation, such as setting of a parameter.

In step S13, information on the gazing point is obtained. The gazing point information obtaining unit 35 detects the point at which the user is gazing within the image displayed on the television receiver 11 and obtains the information. In step S14, the range in which the log is to be obtained is determined. On the basis of the information from the gazing point information obtaining unit 35, the log obtaining range determination unit 36 determines a portion within a predetermined range to be an image in a range in which the log is to be obtained.

Figure 4A:
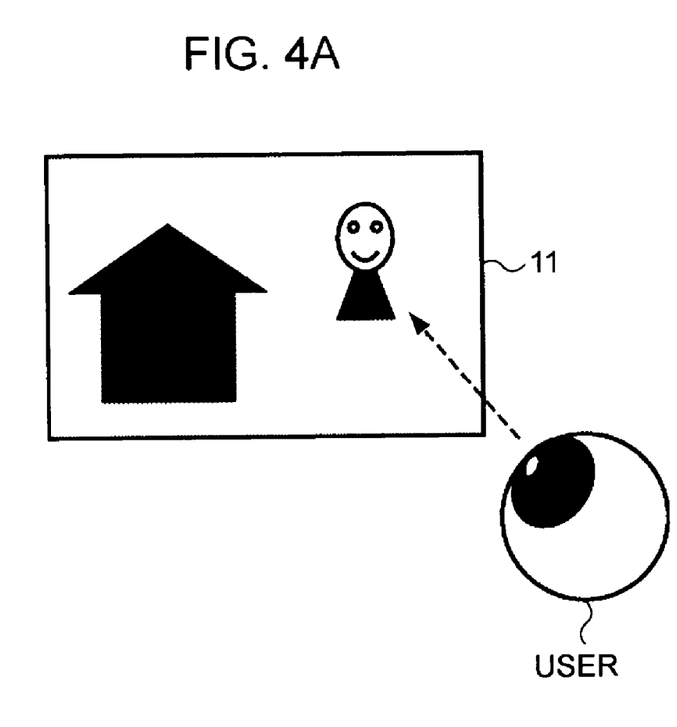
FIGS. 4A and 4B illustrate a gazing point.

At this point, the gazing point will be described with reference to FIGS. 4A and 4B. The gazing point is a point at which the user is gazing. As shown in FIG. 4A, for example, when the user is viewing a program of a television broadcast on the television receiver 11, the user views the full screen, but there is a portion in which, in particular, the user consciously views within that screen. In recent years, the screen of the television receiver 11 has been getting larger. In the case of a large screen, in particular, the user tends to view a portion thereof rather than viewing the full screen.

For example, the example shown in FIG. 4A shows a screen on which a person and a house are displayed on the television receiver 11, and the user notices the person rather than the house. At such a time, the portion of the image of the person is a gazing point.

When such a fact is considered, since the user is viewing near the gazing point, it is possible to allow the user to recognize that, the better the image characteristics of the image in the vicinity of the gazing point, the better the image. Therefore, performing of signal processing specialized for an object that is likely to become a gazing point for the user enables a better image to be provided to the user. For example, by analyzing the log obtained by applying the present invention and by using the result, it is possible to develop a product with which signal processing specialized for an object that is likely to become a gazing point is performed.

Figure 4B:
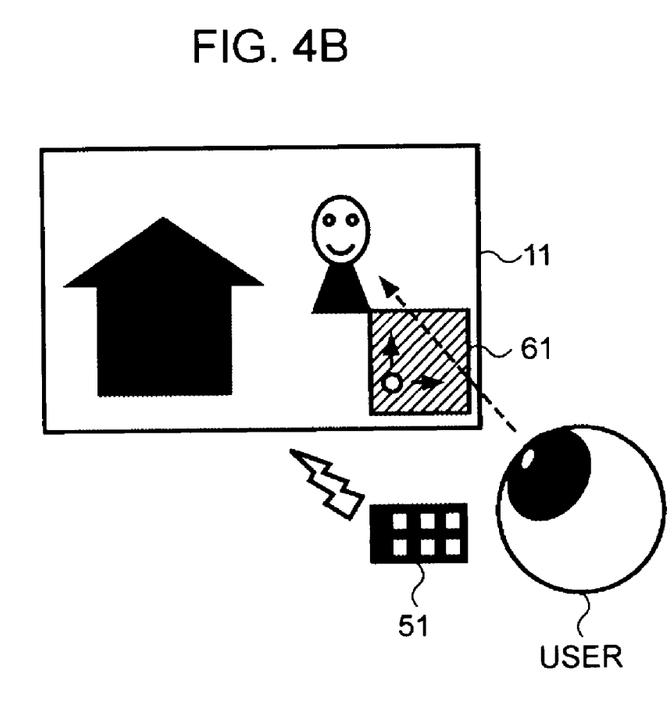

Furthermore, as shown in FIG. 4B, when a set screen 61 is displayed on the television receiver 11 and the user operates the remote controller 51 in order to set a parameter used to adjust image characteristics, in other words, when the user is being involved actively with the image, a more important log can be obtained. By analyzing the log at such a time, it is possible to obtain further useful information.

As described above, on a large screen, the tendency is that a portion of the screen is being gazed. When, in particular, setting on the image characteristics is performed, often, setting is performed so that, while an image in a portion of the screen is being viewed, the image has the color of the user's preferences. For example, in the example shown in FIG. 4B, a person and a house are displayed on the television receiver 11. It is considered that, often, the user performs setting such that the color of the skin of the person matches the user's preferences while operating the remote controller 51 while viewing the image of the person. At such a time, the portion of the image of the person is a gazing point.

Information, shown in FIG. 4B, when the user has set the image characteristics to the user's preferences indicates a state in which the relationship between the image in the vicinity of the gazing point and image processing is deep, and is particularly effective in the case of planning to change the image processing system in a short or long term by using the log.

By obtaining information on the gazing point at which the user gazes and by obtaining the feature quantities regarding the image at the gazing point, it becomes possible to perform a more detailed analysis for the above-described reasons when compared to the case in which, simply, the feature quantities of the image are stored as a feature quantity log and are analyzed.

There are various advantages as a result of obtaining the information on the gazing point. Examples of detecting the gazing point include a method of using an eye mark recorder, a method of detecting the gazing point from the center of the screen, a method of detecting the gazing point from within a zoom image frame, and a method of detecting the gazing point from the tracking point of tracking zoom.

The eye mark recorder is a device for detecting a line of sight. The eye mark recorder is configured in such a manner that the user wears a device like a goggle and the device like the goggle allows the line of sight of the user to be detected. Alternatively, the eye mark recorder is placed below the television receiver 11, the image of the face of the user is captured, and the line of sight of the user is detected by detecting the position of the eye by using image processing or the like.

However, it is difficult to assume that, when the user enjoys a television broadcast on the television receiver 11 or performs the setting of image characteristics, the user wears a goggle. Furthermore, forcing the user to wear a goggle in order to perform the setting of image characteristics is not a desired form. Furthermore, since an expensive dedicated device becomes necessary for the eye mark recorder, it is difficult to install it in a user's house.

Therefore, the eye mark recorder is an effective means when the user is made to experimentarily use it in the case that a product is to be developed, and is considered to be capable of being applied as a device constituting the gazing point information obtaining unit 35. Furthermore, if an eye mark recorder such that a burden is not incurred on the user in the aspects of usage and cost can be supplied, the eye mark recorder can be applied as a device constituting the gazing point information obtaining unit 35, can be installed as a device in the user's house, and can be used.

The point of sight detected using the eye mark recorder may be set as a gazing point, the gazing point may be set as a range in which a log is to be obtained, and the range formed of a predetermined number of pixels, in which the gazing point is at the center, may be set as a range in which a log is to be obtained. When the range formed of a predetermined number of pixels, in which the gazing point is at the center, is set as a range in which a log is to be obtained, the predetermined range may be variable.

When a predetermined range is set to be variable, for example, an object at the gazing point may be judged, so that the object is set as a range.

Next, a description will be given of a case in which the range in which a log is to be obtained is at the center of the screen. The center of the screen means the center of the display section (not shown) of the television receiver 11. First, the time at which an image displayed on the display section of the television receiver 11 is captured is considered. In most cases, at the time of image capturing, the photographer performs image capturing in such a manner that what is desired to be image-captured is positioned at the center of the screen.

Therefore, when such an image is to be displayed, since what is desired to be image-captured by the photographer is displayed at the center of the screen, gazing at the portion is easier to understand the intent of the photographer than gazing at the other portion. That is, since an important portion of the image is often positioned at the center of the screen, the user often views the center of the screen. Furthermore, when the viewing time is considered, the user often gazes at the center of the screen rather than gazing at the ends of the screen. Therefore, the center of the screen may be set as a gazing point.

However, when content displayed on the television receiver 11 is content such as a movie, in a movie or the like, image capturing such that the entire screen is created as a picture is possible. Therefore, the center of the screen does not necessarily become the gazing point. In order to deal with such a time, for example, information indicating the genre of content may be obtained as a log, and analysis may be performed by considering the genre by using the information on the genre at the time of analysis.

When the center of the screen is set as a gazing point, the gazing point may be set as a range in which a log is to be obtained, and the range formed of a predetermined number of pixels, in which the gazing point is at the center, may be set as a range in which a log is to be obtained. In this case, since the gazing point is fixed to the center of the screen, the range in which a log is to be obtained may be set as a fixed range formed of a predetermined number of pixels, containing the center of the screen.

Furthermore, when a predetermined range is to be set variable, for example, an object at the gazing point may be judged, and the object may be set as a range.

Figure 5A:
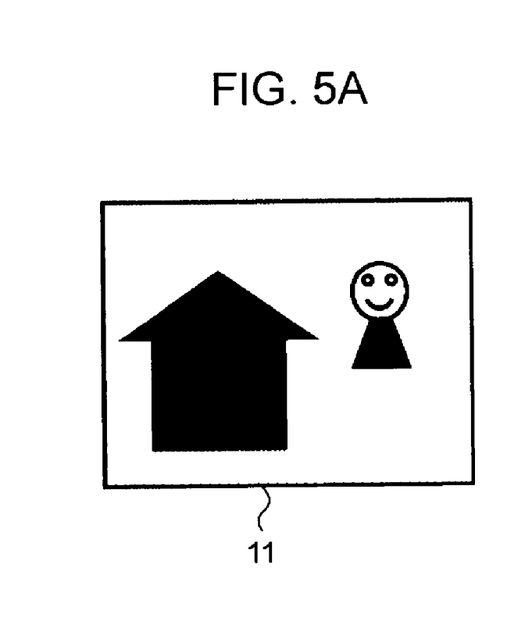
FIGS. 5A, 5B, and 5C illustrate zoom.
Figure 5B:
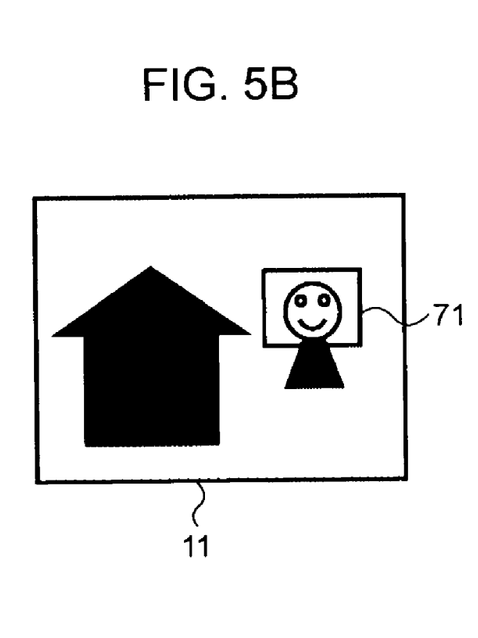
Figure 5C:
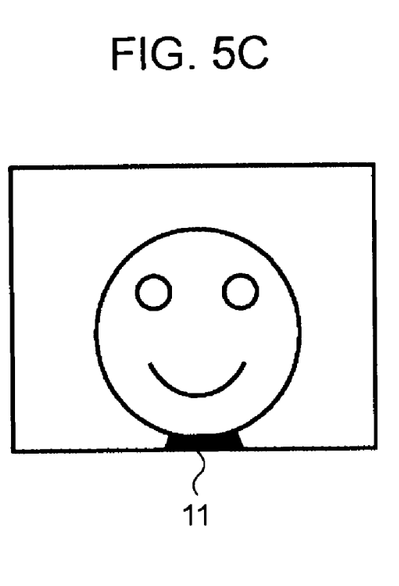

Next, a description will be given of a case in which a range in which a log is to be obtained is a zoom image frame. Referring to FIGS. 5A, 5B, and 5C, zoom will be described. FIG. 5A shows an example of an image displayed on the television receiver 11. The image shown in FIG. 5A is an image in which a house and a person are displayed. When such an image is being displayed, the user wants to closely view the face of the person and applies zoom to the image of the face of the person. When the zoom, that is, the expansion of the image, is instructed, the range of the image to be expanded is set by the user.

FIG. 5B shows a state in which an image frame 71 of zoom is set by the user to a portion of the face of a person within the image. In the example shown in FIG. 5B, the image frame 71 is set to a portion of the image of the face of the person. When the image frame 71 is set in this manner, only the image within the range in which the image frame 71 is set is displayed on the television receiver 11. That is, in this case, as shown in FIG. 5C, the image of the face of the person is displayed on the television receiver 11.

In the manner described above, when the user instructs zoom (expansion), the user is considered to be interested in the image. Although the user not necessarily zooms an object desired to be viewed at pin-point, it is considered that at least a portion in which the user is interested is zoomed. In other words, the user tends to dezoom a portion in which the user is not interested. Therefore, the center of the image instructed so as to be zoomed may be set as a gazing point.

When the center of the image frame of the zoom is set as a gazing point, the gazing point may be set as a range in which a log is to be obtained, and the range formed of a predetermined number of pixels, in which the gazing point is at the center, may be set as a range in which a log is to be obtained. In this case, since the gazing point is at the center of the image frame of the zoom, the range in which a log is to be obtained may be set to match the image frame. When set in this manner, the image frame is made variable (size set by the user).

Furthermore, when a predetermined range is made variable regardless of the image frame, for example, the object at the gazing point is judged, and the object may be set as a range. Some applications for processing zoom are structured in such a manner that the zoom factor and the zoom position can be changed by operating the remote controller 51 even after the zoom is performed. In such a case, for example, when the zoom factor is changed, the size in the predetermined range in which a log is to be obtained may be changed.

Next, a description will be given of a case in which a range in which a log is to be obtained is a tracking point of tracking zoom. Referring to FIGS. 6A to 6E, tracking zoom will be described. The tracking zoom is an assist function when the user uses a zoom function. This assist function is a function in which, when the remote controller 51 is operated by the user in order to perform zooming, the tracking point is focused to an object to be tracked so as to be specified, the zoom process is continued while performing a process for tracking the object. Some applications for processing tracking zoom are structured in such a manner that the zoom image frame can be changed or the tracking point can be changed during tracking zoom.

Figure 6A:
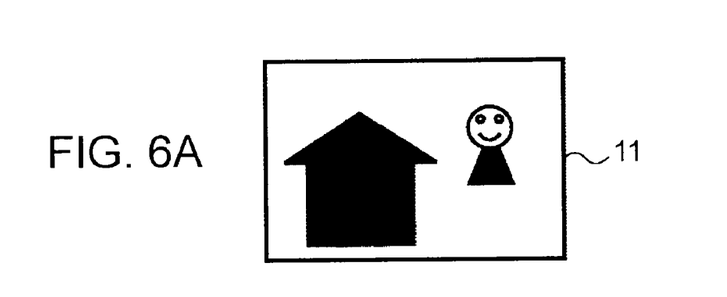
FIGS. 6A, 6B, 6C, 6D, 6E illustrate tracking zoom.

FIG. 6A shows an example of an image displayed on the television receiver 11. The image shown in FIG. 6A shows an image in which a house and a person are displayed. When such an image is displayed, the user wants to closely view the face of the person, applies zoom on the image of the face of the person, and performs setting so that the face of the person is typically displayed in an expanded state. That is, in this case, tracking zoom is set to the face of the person.

Figure 6B:
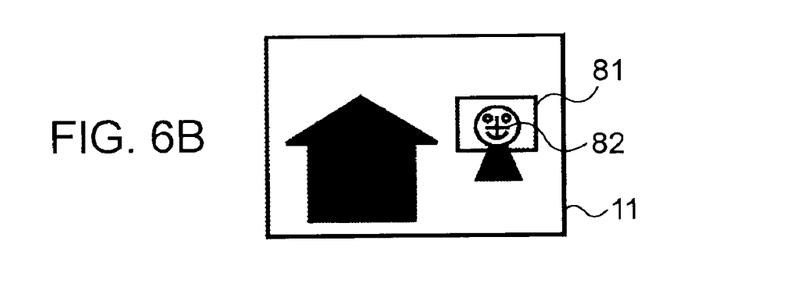

In a state in which a predetermined image is expanded, when the image is instructed to be tracked and displayed, the center of the image to be expanded and the range thereof are set by the user. FIG. 6B shows a state in which an image frame 81 of zoom is set by the user to a portion of the face of a person in the image. The image frame 81 may be set to a predetermined size in which a tracking point 82 is at the center, and the size may be set by the user.

Figure 6C:
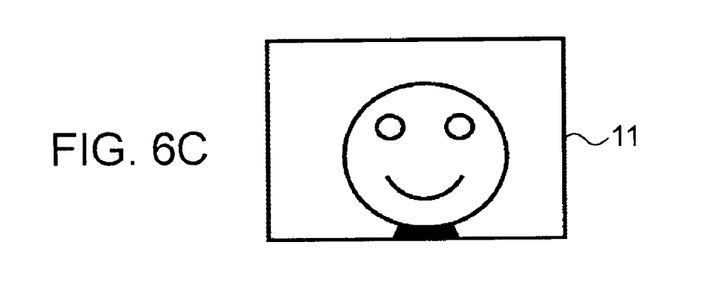

In the case of an example shown in FIG. 6B, the tracking point 82 is set in the portion of the image of the face of the person, and the image frame 81 such that the entirety of the face of the person is contained is set to the portion of the image of the face of the person. When the tracking point 82 and the image frame 81 are set in this manner, only the image in the range in which the image frame 81 has been set is displayed on the television receiver 11. At this time, the tracking point is positioned at the center of the screen and is zoomed in accordance with the zoom image frame (zoom factor). That is, in this case, as shown in FIG. 6C, the image of the face of the person is displayed on the television receiver 11.

Figure 6D:
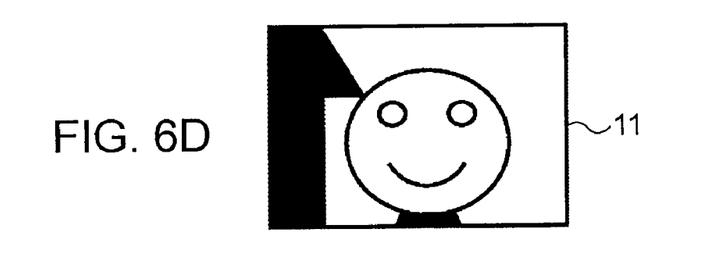

Furthermore, when the person within the screen moves, since the person is being tracked while the expanded state is maintained, for example, a screen shown in FIG. 6D is displayed on the television receiver 11. When FIG. 6C is compared with FIG. 6D, the portion of an house shown in FIG. 6C is shown in FIG. 6D. The image shown in FIG. 6D, when tracking zoom is not set, is an image when a screen shown in FIG. 6E is displayed on the television receiver 11.

Figure 6E:
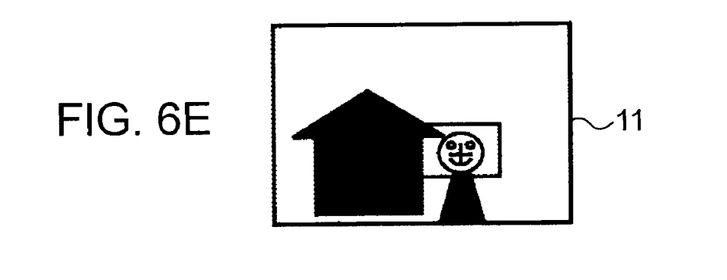

FIG. 6E is shown for illustration. In actual processing, the image is such that it not provided to the user unless specified by the user and a tracking point and a zoom image frame are displayed in an input image during tracking zoom. With respect to the image of FIG. 6B, in the image of FIG. 6E, the person has moved obliquely to the lower left in the figure. When the object to be tracked moves, for the tracking zoom, since a zoom process is performed while tracking the object, an image shown in FIG. 6D is provided to the user.

Therefore, while a tracking zoom process is being performed, an image of an object is obtained, wherein the object is shown as if tracked by a moving camera at the place where image capturing has been performed. Depending on the setting, there are cases in which, when the object to be tracked approaches the image frame of the input image, an output such that the object to be tracked comes off the image frame center is made.

The tracking point of the tracking zoom is most related to the gazing point when compared to the eye mark recorder, the image center, and the zoom image frame. As described with reference to FIGS. 6A to 6E, the tracking zoom is an application of tracking a tracking point and zooming it. When such an application is to be started up by the user, the user specifies what the user is interested in or what the user wants to view. Therefore, such a portion where the user wants to view may be set as a gazing point.

When the tracking point of the tracking zoom is set as a gazing point, the gazing point may be set as a range in which a log is to be obtained, and a range formed of a predetermined number of pixels, in which the gazing point is at the center, may be set as a range in which a log is to be obtained. In this case, since the gazing point is within the image frame of the zoom, the range in which a log is to be obtained may be set so as to match the image frame. When set in this manner, the image frame has a size set by the user and is made variable.

Furthermore, when a predetermined range is made to be variable regardless of the image frame, for example, an object at the gazing point may be judged, and the object may be set as a range.

Referring back to the flowchart in FIG. 3, in steps S13 and S14, the gazing point information obtaining unit 35 (FIG. 2) obtains information on the gazing point at which the user gazes, and the log obtaining range determination unit 36 determines the range in which a log is to be obtained.

As described above, regarding the range in which the gazing point and the log are obtained, as described above, for example, the tracking point of the tracking zoom is set as a gazing point, and the image frame of the tracking zoom is set as a range in which a log is to be obtained. A case in which tracking zoom is applied will be described later with reference to FIG. 7.

In step S14, the feature quantities within the range are obtained. The log obtaining unit 34 extracts, from the feature quantities supplied from the feature quantity obtaining unit 33, the feature quantities extracted from the image in the range determined by the log obtaining range determination unit 36. The extracted feature quantities are used as a feature quantity log.

In step S16, operation information is obtained. The photoreceiving unit 38 receives a signal from the remote controller 51. The signal from the remote controller 51, which is received by the photoreceiving unit 38, is supplied to the controller 39, whereby the signal is analyzed. The controller 39 performs control on the basis of the analysis result (operation information) and also supplies the operation information to the log obtaining unit 34. The log obtaining unit 34 uses the supplied operation information as an operation log.

Here, although operation information is used, operation results may be used as an operation log. For example, when the user performs an operation for adjusting image characteristics, parameters as a result of operations for adjusting the image characteristics may be used as an operation log.

In step S17, the log is stored. The log obtaining unit 34 causes the obtained feature quantity log and operation log to be stored in the log storage unit 37 in such a manner as to be associated with each other.

As described above, in this embodiment, information on the image in the vicinity of a portion at which the user gazes and information on operations performed by the user at the time are stored as a log.

In this embodiment, the description is continued by assuming that the feature quantity log and the operation log are stored in such a manner as to be associated with each other. In place of the operation log, other information may be stored in such a manner as to be associated with the feature quantity log. For example, information on operations and states of devices may be associated with the feature quantity log.

Furthermore, only the feature quantity log may be stored. The feature quantity log, as described above, is information extracted from the image at which the user gazes. Therefore, what kind of image the image at which the user gazes is can be understood by analyzing the log. As a result, it is possible to know what kind of image the user is interested in and what kind of image (image characteristics) the user is concerned about.

As a result of such a log being stored, there are the following advantages.

First, it becomes possible to solve the problem of privacy. As the feature quantity log, feature quantities of images are stored. However, the feature quantities with which the original image can be restored by analyzing the feature quantities or the feature quantities with which the content meaning of the image can be imagined have a risk of infringing upon the user's privacy, and therefore may not be obtained. In order that such feature quantities do not be obtained, overall ambiguous information is forced to be feature quantities. As a result, important information may be buried.

However, according to this embodiment, since only the feature quantities of only one point of the gazing point or only several pixels in the vicinity of the gazing point are obtained, it is not possible to estimate what kind of image the original entire image was.

Furthermore, when the pixel value does not be obtained as is, a degeneration process is performed so that the original image is not restored. When compared to the case in which content meaning is removed from the entire screen, a degeneration method in which content meaning is removed from only near the gazing point makes it possible to prevent important information from being buried at analysis time because the loss of necessary information is small.

In the manner described above, according to this embodiment, it is possible to obtain a sufficient log as information while protecting user's privacy.

Furthermore, according to this embodiment, it is possible to solve the problem of capacity. As described with reference to FIG. 1, the log obtaining device 12 is installed into the television receiver 11, and continues to operate until the television receiver 11 is no longer owned by the user. That is, the log obtaining device 12 will continue to store a log for a long period of time. However, there is a limitation on the capacity of the log storage unit 37 for storing the log.

When this fact is considered, there is a demand for the amount of data of the log for each storage time to be as small as possible. However, if local features of an image are to be obtained by using the image feature quantities, the size becomes large, and the smaller the size becomes, the more ambiguous the features that can be represented become overall.

However, according to this embodiment, it is possible to limit the image for which the feature quantities are extracted to near the gazing point, and it is possible to compute the feature quantities for each pixel. As a consequence, the accuracy of the log can be improved and also, the amount of data can be reduced.

Furthermore, according to this embodiment, it is possible to solve the problem of a histogram. In the above-described embodiments, although not mentioned, the feature quantity log may be obtained in the form of a histogram. When a histogram is used, space information is lost, and there is a limitation when the features of the entire screen are shown.

However, according to this embodiment, the range of the image to be processed is limited to near the gazing point. As a consequence, the mixing range becomes narrow as a result of being formed into a histogram, and more target features can be left.

As has been described above, by applying the present invention, it is possible to obtain various advantages.

Log Obtaining Device in which Tracking Zoom is Applied

Next, a log obtaining device in which tracking zoom is applied will be described. As described above, as a range in which a gazing point and a log are to be obtained, the tracking point of tracking zoom and the image frame thereof can be used. FIG. 7 shows an example of the internal configuration of the log obtaining device 12 in which tracking zoom is applied.

The log obtaining device 12 shown in FIG. 7 includes an image data input unit 101, an image processor 102, a feature quantity obtaining unit 103, a log obtaining unit 104, a gazing point information obtaining unit 105, a log obtaining range determination unit 106, a log storage unit 107, a photoreceiving unit 108, a controller 109, and a tracking zoom processor 110.

When the log obtaining device 12 shown in FIG. 7 is compared with the log obtaining device 12 shown in FIG. 2, the log obtaining device 12 shown in FIG. 7 differs in that the tracking zoom processor 110 is added to the log obtaining device 12 shown in FIG. 2. The tracking zoom processor 110 is provided to perform a tracking zoom process as described with reference to FIGS. 6A, 6B, 6C, 6D, 6E. The gazing point information obtaining unit 105 obtains information on a tracking point set by the tracking zoom processor 110 and the image frame, and supplies them to the log obtaining range determination unit 106.

Since the remaining construction is the same as that of the log obtaining device 12 shown in FIG. 2, the description thereof is omitted. The configuration can be formed in such a way that the gazing point information obtaining unit 105 is omitted, and the information on the tracking point and the image frame can be directly supplied to the log obtaining range determination unit 106 from the tracking zoom processor 110.

Figure 8:
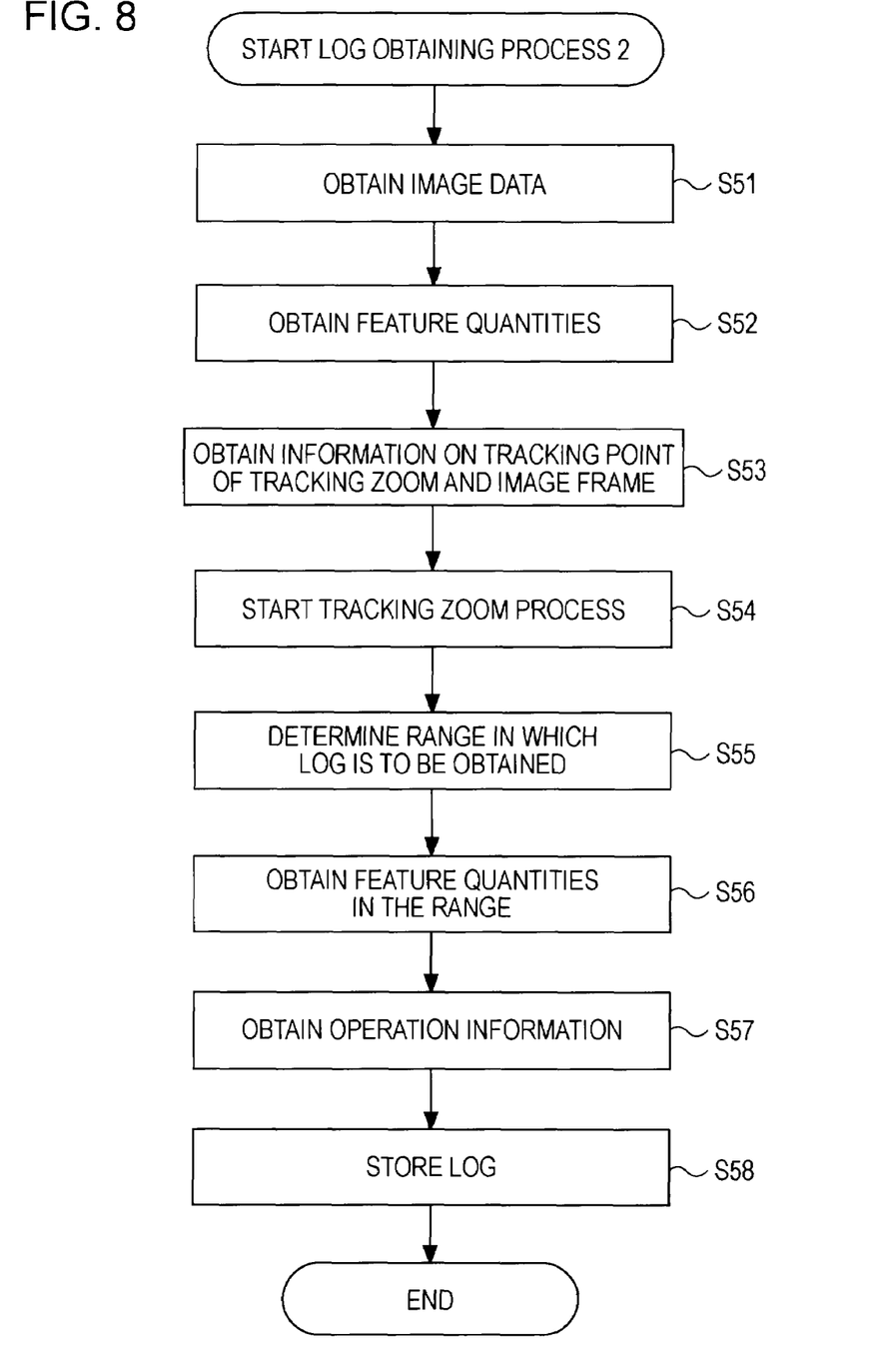
FIG. 8 is a flowchart illustrating the operation of the log obtaining device.

Referring to FIG. 8, the operation of the log obtaining device 12 shown in FIG. 7 will be described. In step S51, image data is obtained. The image data input unit 101 supplies the image data that is supplied from the outside to the image processor 102. In step S52, feature quantities are obtained. On the basis of the data from the image processor 102, the feature quantity obtaining unit 103 extracts the feature quantities from the image that has been processed at that time. The feature quantities extracted in step S52 are, for example, feature quantities regarding activities as described above. Since the feature quantities have already been described, the description thereof is omitted herein.

In step S53, information on the tracking point of tracking zoom and an image frame is obtained. In step S54, a tracking zoom process is started. The tracking zoom processor 110 obtains the information on the tracking point set by the user and the image frame, performs a tracking zoom process on the basis of the information on the obtained tracking point and image frame, and outputs the information to the gazing point information obtaining unit 105. The gazing point information obtaining unit 105 sets the tracking point as a gazing point and outputs information on the gazing point to the log obtaining range determination unit 106.

In step S55, the log obtaining range determination unit 106 determines a range in which a log is to be obtained. For example, the log obtaining range determination unit 106 determines an image frame containing the gazing point as a range in which a log is to be obtained. The information on the determined range is supplied to the log obtaining unit 104.

Processing of steps S56 to S58 is performed similarly to processing of steps S15 to S17 shown in the flowchart of FIG. 3, which has already been described, and accordingly, a description thereof is omitted herein.

In the manner described above, by setting the tracking point of tracking zoom as a gazing point and by storing, as a log, information on an image at the gazing point or in the vicinity of the gazing point, the above-described various advantages can be obtained.

Recording Medium

The above-described series of processing can be performed by hardware and also by software. When the series of processing is to be performed by software, a program constituting the software is installed from a program recording medium into a computer that is incorporated in specialized hardware or into a general-purpose computer capable of performing various functions by installing various programs.

Figure 9:
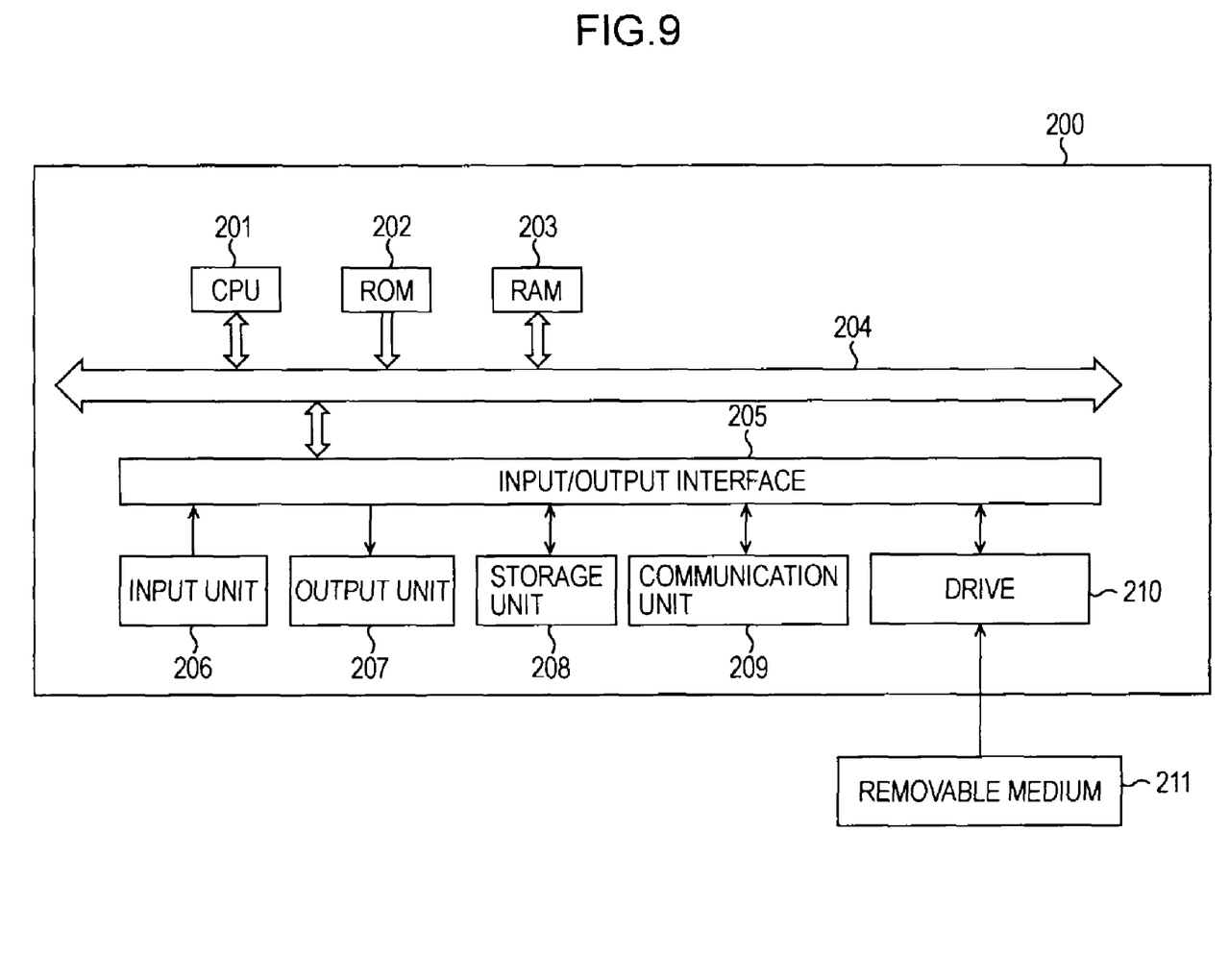
FIG. 9 illustrates a recording medium.

FIG. 9 is a block diagram showing an example of the hardware configuration of a personal computer that performs the above-described series of processes in accordance with a program.

In the computer, a CPU (Central Processing Unit) 201, a ROM (Read Only Memory) 202, and a RAM (Random Access Memory) 203 are interconnected with one another via a bus 204.

Furthermore, an input/output interface 205 is connected to the bus 204. An input unit 206, an output unit 207, a storage unit 208, a communication unit 209, and a drive 210 are connected to the input/output interface 205. The input unit 206 includes a keyboard, a mouse, a microphone, and the like. The output unit 207 includes a display device, a speaker, and the like. The storage unit 208 includes a hard disk, a nonvolatile memory, and the like. The communication unit 209 includes a network interface and the like. The drive 210 drives a removable medium 211, such as a magnetic disk, an optical disc, a magneto-optical disc, or a semiconductor memory.

In the computer configured as described above, the CPU 201 loads, for example, a program stored in the storage unit 208 to the RAM 203 via the input/output interface 205 and the bus 204, and executes the program, thereby performing the above-described series of processes.

The program executed by the computer (CPU 201) is recorded on a removable medium 211, which is a packaged medium formed of, for example, a magnetic disk (including a flexible disk), an optical disc (a CD-ROM (Compact Disc-Read Only Memory), a DVD (Digital Versatile Disc), etc.), a magneto-optical disc, or a semiconductor memory. Alternatively, such a program is provided via a wired or wireless transmission medium, such as a local area network, the Internet, or a digital satellite broadcast.

By installing the removable medium 211 into the drive 210, the program can be installed into the storage unit 208 via the input/output interface 205. Furthermore, the program can be received by the communication unit 209 via a wired or wireless transmission medium, and can be installed into the storage unit 208. In addition, the program can be installed in advance into the ROM 202 and the storage unit 208.

The program to be executed by the computer may be a program with which processing is performed chronologically in accordance with the order described in this specification, or may be a program with which processing is performed in parallel or at a necessary timing, such as when being called.

In this specification, the system designates the entire apparatus formed of a plurality of devices.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   obtaining means for obtaining feature quantities of an image that is viewed by a user, the feature quantities corresponding to information of characteristics of the image;
   detection means for detecting a gazing point at which the user gazes within the image; and
   log creating means for
      obtaining information on an operation performed by the user, the operation including a setting of a parameter associated with the characteristics of the image, and
      creating a log by storing, from among a possible set of the feature quantities obtained by the obtaining means, a subset of feature quantities, the subset of feature quantities including feature quantities extracted from the image at the gazing point detected by the detection means or from a part of the image in a predetermined range containing the gazing point, and by storing the information on the operation in an associated relationship with the subset of the extracted feature quantities.

2. The information processing apparatus according to claim 1, further comprising tracking zoom processing means for performing processing for tracking an image in a predetermined portion within the image and for displaying the image in the predetermined portion in a zoomed state,
   wherein the detection means sets a tracking point set by the tracking zoom processing means to be the gazing point.

3. The information processing apparatus according to claim 2, wherein the part of the image in the predetermined range is the image in the predetermined portion.

4. The information processing apparatus according to claim 1, wherein the information of characteristics of the image include an activity within the image, noise within the image, and color within the image.

5. An information processing method comprising the steps of:
   obtaining feature quantities of an image that is viewed by a user, the feature quantities corresponding to information of characteristics of the image;
   detecting a gazing point at which the user gazes within the image;
   obtaining information on an operation performed by the user, the operation including a setting of a parameter associated with the characteristics of the image; and
   creating a log by storing, from among a possible set of the obtained feature quantities, a subset of feature quantities on a predetermined storage medium, the subset of feature quantities including feature quantities extracted from the image at the detected gazing point or from the image in a predetermined range containing the gazing point, and by storing the information on the operation in an associated relationship with the subset of the extracted feature quantities.

6. A non-transitory computer-readable storage medium encoded with executable instructions that cause a data processor to implement a method of extracting image features corresponding to a gazing point, comprising:
   obtaining feature quantities of the image that is viewed by a user, the feature quantities corresponding to information of characteristics of the image;
   detecting the gazing point at which the user gazes within the image; and
   creating a log by storing, from among a possible set of the obtained feature quantities, a subset of feature quantities to an electronic memory, the subset of feature quantities including feature quantities extracted from the image at the detected gazing point or from the image in a predetermined range containing the gazing point, and by storing the information on the operation in an associated relationship with the subset of the extracted feature quantities.

7. An information processing apparatus comprising:
   an obtaining section configured to obtain feature quantities of an image that is viewed by a user, the feature quantities corresponding to information of characteristics of the image;
   a detector configured to detect a gazing point at which the user gazes within the image; and
   a log creating unit configured to
      obtain information on an operation performed by the user, the operation including a setting of a parameter associated with the characteristics of the image, and
      create a log by storing, from among a possible set of the feature quantities obtained by the obtaining unit, a subset of feature quantities, the subset of feature quantities including feature quantities extracted from the image at the gazing point detected by the detector or from the image in a predetermined range containing the gazing point, and by storing the information on the operation in an associated relationship with the subset of the extracted feature quantities.

* * * * *